(12) United States Patent
Preston et al.

(10) Patent No.: US 9,079,312 B2
(45) Date of Patent: Jul. 14, 2015

(54) PART TRANSFER SYSTEM THAT USES EXISTING PART FEATURES, AND A METHOD OF USING THE PART TRANSFER SYSTEM

(71) Applicant: GM GLOBAL TECHNOLOGY OPERATIONS LLC, Detroit, MI (US)

(72) Inventors: Christopher B. Preston, Troy, MI (US); Christine A. Blake, Royal Oak, MI (US); Sunil Nandwani, Troy, MI (US); John S. Agapiou, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 63 days.

(21) Appl. No.: 13/875,532

(22) Filed: May 2, 2013

(65) Prior Publication Data

US 2014/0327260 A1    Nov. 6, 2014

(51) Int. Cl.
*B25J 15/00*    (2006.01)

(52) U.S. Cl.
CPC .................................. *B25J 15/0009* (2013.01)

(58) Field of Classification Search
USPC ............ 294/119.1, 207, 86.4, 87.1, 196, 902; 29/281.5, 787, 464; 269/33, 35, 43, 47; 901/8, 30, 31, 39, 41
See application file for complete search history.

(56) References Cited

U.S. PATENT DOCUMENTS

| | | | | |
|---|---|---|---|---|
| 2,754,708 | A * | 7/1956 | Peterson | 269/224 |
| 3,703,762 | A * | 11/1972 | Lind | 29/464 |
| 3,790,236 | A * | 2/1974 | Pierce | 29/464 |
| 4,179,106 | A * | 12/1979 | Bergman | 269/20 |
| 4,194,437 | A * | 3/1980 | Rosheim | 92/120 |
| 4,444,534 | A * | 4/1984 | Bergman | 409/164 |
| 4,572,564 | A * | 2/1986 | Cipolla | 294/207 |
| 4,609,220 | A * | 9/1986 | Scott | 294/87.1 |
| 4,631,815 | A * | 12/1986 | Bocchicchio et al. | 29/739 |
| 4,757,608 | A * | 7/1988 | Ochi | 29/787 |
| 4,860,424 | A * | 8/1989 | Kaibuki et al. | 29/434 |
| 5,050,919 | A * | 9/1991 | Yakou | 294/2 |
| 5,116,094 | A * | 5/1992 | Jones | 294/81.61 |
| 5,195,350 | A * | 3/1993 | Aikens et al. | 29/874 |
| 7,290,761 | B2 * | 11/2007 | Siegel | 269/266 |
| 7,488,020 | B2 * | 2/2009 | Sotome et al. | 294/207 |

* cited by examiner

*Primary Examiner* — Paul T Chin

(74) *Attorney, Agent, or Firm* — Quinn Law Group, PLLC

(57) ABSTRACT

A part transfer system includes a robotic arm, and an end effector attached to the robotic arm. The end effector includes a locating pin that is operable to engage an existing part feature of a part. The presence of the existing part feature is required for the intended use of the part, and therefore serves a function of the part other than a transfer function. The existing part feature defines a circular aperture disposed on a feature plane. The locating pin includes an engagement portion that extends along a longitudinal axis of the at least one locating pin. The engagement portion includes a diameter that is tapered along the longitudinal axis such that the engagement portion of the locating pin engages a radial inner edge of the circular aperture on the feature plane along an approximately annular contact ring disposed about a circumference of the tapered portion.

18 Claims, 5 Drawing Sheets

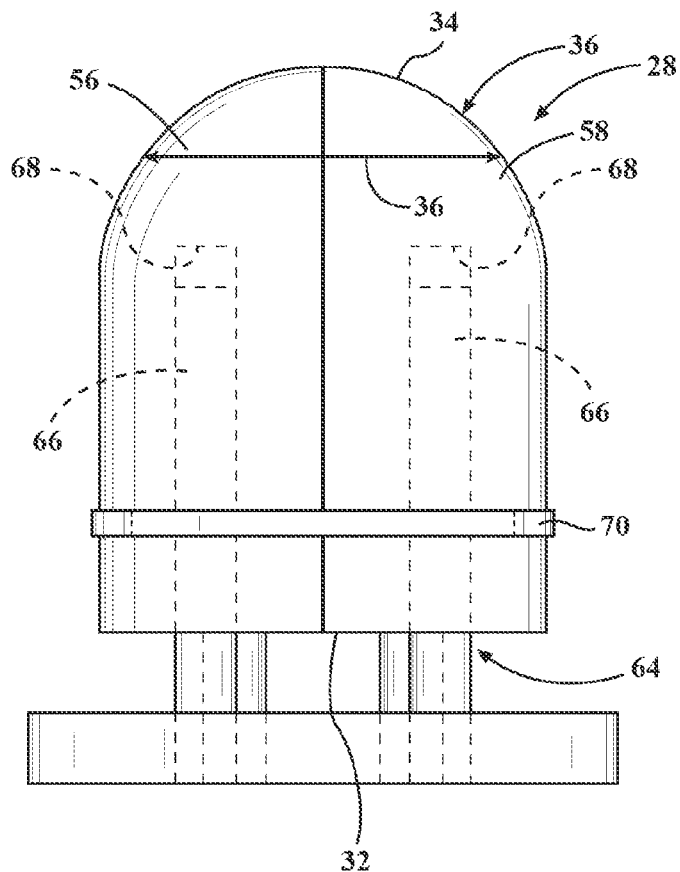
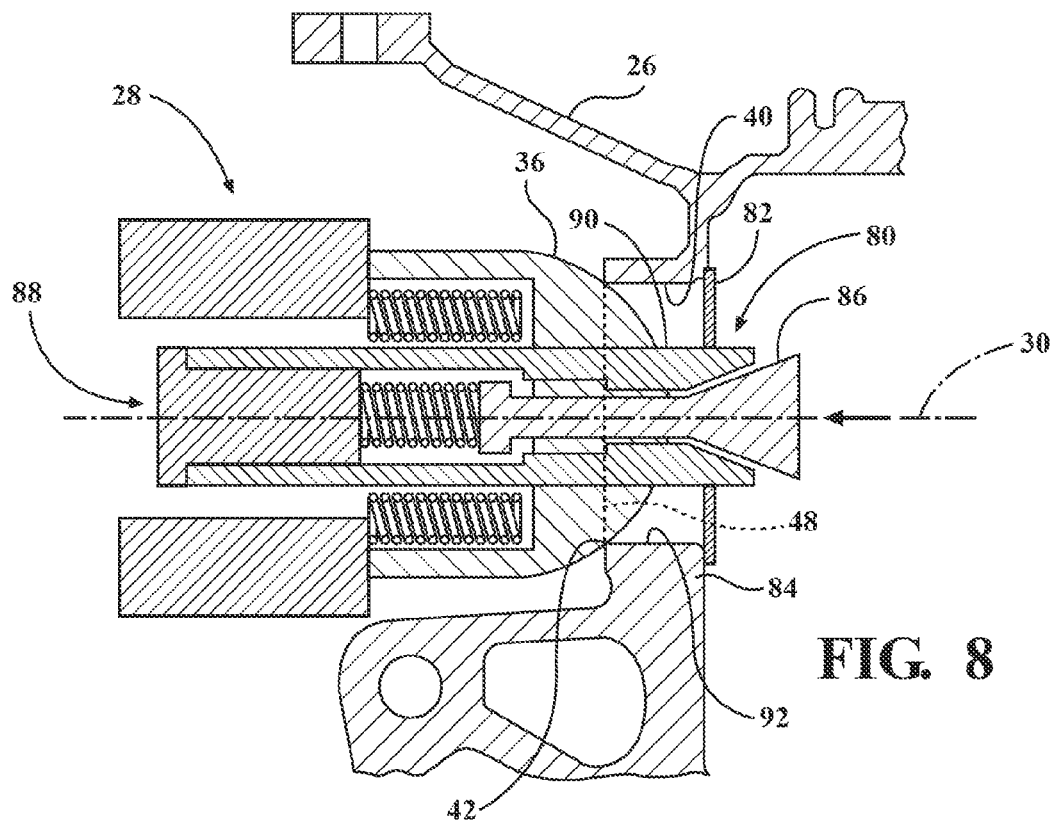

PART TRANSFER SYSTEM THAT USES EXISTING PART FEATURES, AND A METHOD OF USING THE PART TRANSFER SYSTEM

TECHNICAL FIELD

The invention generally relates to a part transfer system, and more specifically to a locating pin of an end effector of the part transfer system and a method of grasping a part with the part transfer system.

BACKGROUND

Robotic arms are often used to grasp and move parts during manufacture and/or assembly. The robotic arms include an end effector that is configured to grasp and/or manipulate the part. The end effector may include one or more, typically three, locating pins to grasp and control the part. The part is formed with locating bosses having a circular aperture formed therein. For example, the part may be formed with two locating bosses on one side of the part, and one locating boss on a second side of the part and disposed in opposition with the first two locating bosses. The locating pins on the end effector engage and/or grasp the part at the locating bosses in order to move the part. In order to secure the part relative to the end effector, a force is applied to generate pressure between opposing planar surfaces of the locating pins and the locating bosses. The locating bosses serve no other purpose for the part other than to provide a feature on the part for the locating pins of the end effector to engage.

SUMMARY

A part transfer system is provided. The part transfer system includes an end effector that is attachable to a robotic arm. The end effector includes at least one locating pin that is operable to engage an existing part feature of a part. The presence of the existing part feature is required for the intended use of the part. The existing part feature defines a circular aperture disposed on a feature plane. The at least one locating pin includes an engagement portion that extends along a longitudinal axis of the at least one locating pin. The engagement portion includes a diameter that is tapered along the longitudinal axis such that the engagement portion of the locating pin engages a radial inner edge of the circular aperture on the feature plane along an approximately annular contact ring disposed about a circumference of the tapered portion.

A method of grasping a part with a part transfer system is also provided. The method includes providing an end effector for a robotic arm that includes at least one locating pin having a tapered engagement portion. The tapered engagement portion of the locating pin is moved into abutting engagement with an inner radial edge of a circular aperture of an existing part feature of the part. The presence of the existing part feature of the part is required for the intended use of the part. The engagement portion contacts the inner radial edge of the circular aperture on a feature plane along an approximately annular contact ring disposed about a circumference of the tapered engagement portion.

Accordingly, because the tapered engagement portion of the locating pin engages the existing part feature along the annular contact ring at the inner radial edge of the circular aperture, instead of between opposing planar surfaces, the locating pin does not engage or contact the inner surface of the circular aperture, nor the outer planar surface of the existing part feature. Because the locating pin only contacts the circular aperture along the annular contact ring, the locating pin may be used to grasp the part using the existing part features, which must be formed into the part for the part to perform its intended function, thereby eliminating the need to form any additional locating bosses into the part.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 7 is a schematic side view of the locating pin shown in FIG. 6, viewed parallel with the longitudinal axis of the locating pin.

FIG. 8 is a schematic cross sectional view of a locating pin taken along a longitudinal axis of the locating pin

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be realized by any number of hardware, software, and/or firmware components configured to perform the specified functions.

Referring to the Figures, wherein like numerals indicate like parts throughout the several views, a part transfer system is generally shown at 20. The part transfer system 20 includes a robotic arm 22 having an end effector 24 attached to the robotic arm 22. The end effector 24 is used to grasp a part, i.e., a work piece 26, while the robotic arm 22 is used to move the grasped work piece 26 between different stations as is known in the art.

Figure 1:
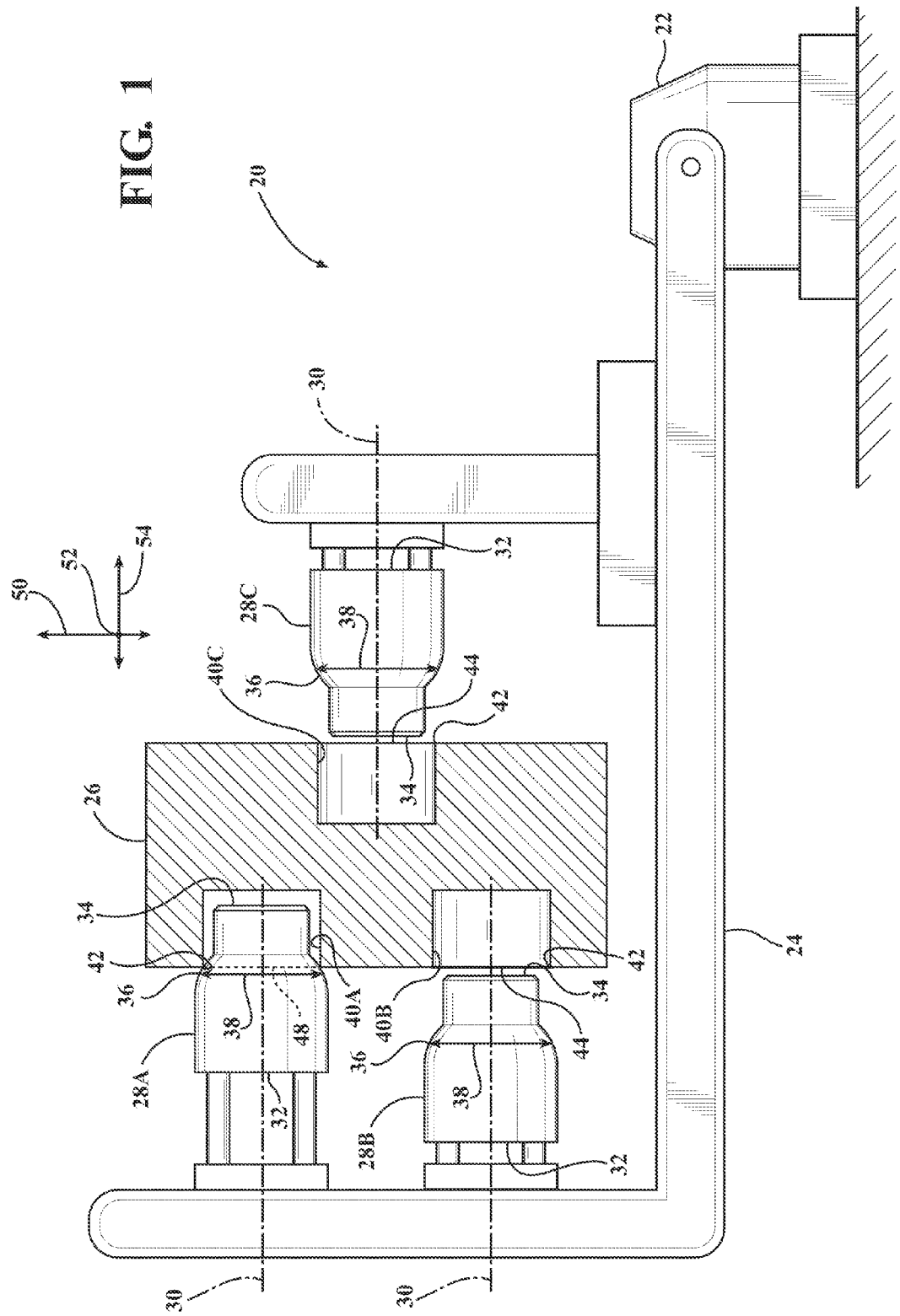
FIG. 1 is a schematic plan view of a part transfer system showing a first locating pin engaged with an existing part feature of a part.
Figure 2:
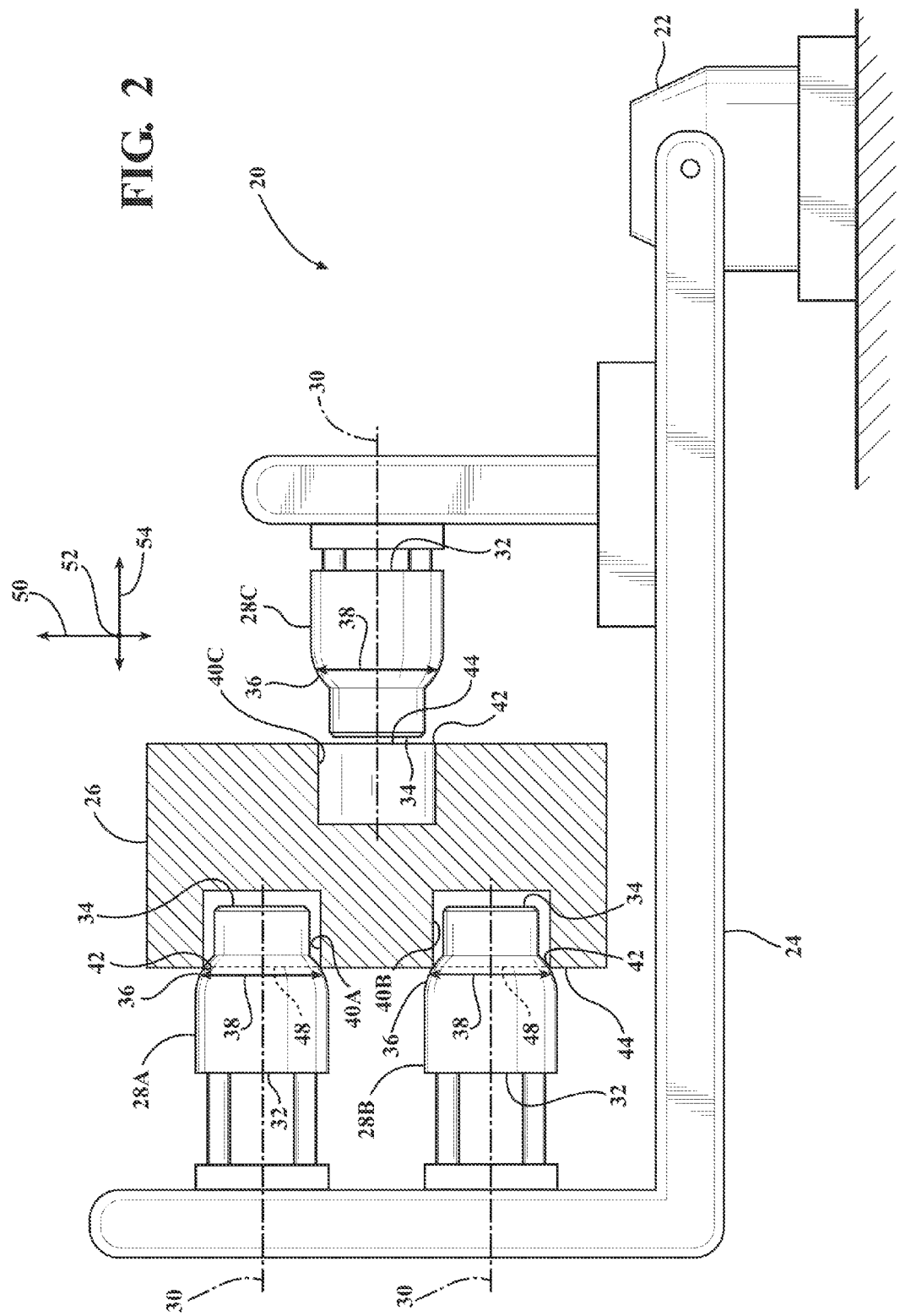
FIG. 2 is a schematic plan view of the part transfer system showing the second locating pin engaged with the respective existing part feature.
Figure 3:
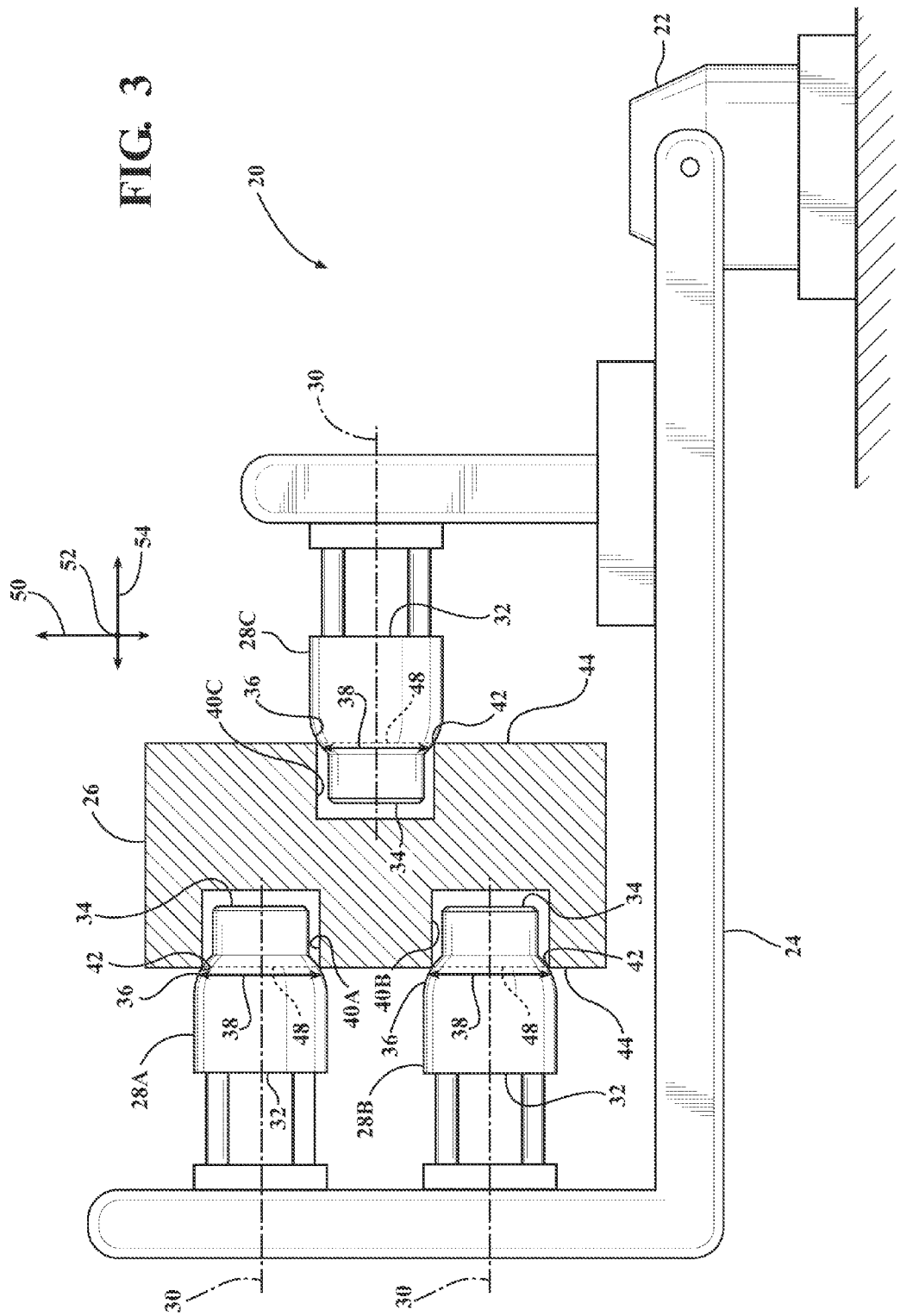
FIG. 3 is a schematic plan view of the part transfer system showing the third locating pin engaged with the respective existing part feature.

The end effector 24 includes at least one locating pin 28. Preferably, and as shown in FIGS. 1 through 3, the end effector 24 includes three locating pins 28, i.e., a first locating pin 28A, a second locating pin 28B, and a third locating pin 28C. The locating pins 28 are referred to generally by the reference numeral 28, and are referred to specifically and shown in the Figures by the reference numerals 28A, 28B, and 28C.

The locating pins 28 extend along a longitudinal axis 30 between a supported end 32 and an insertion end 34. The locating pins 28 are attached to the end effector 24 at the supported end 32. An engagement portion 36 of the locating pins 28 is disposed between the supported end 32 and the insertion end 34. The engagement portion 36 includes a diameter 38 that is tapered along the longitudinal axis 30. The taper of the engagement portion 36 increases in size with an increase in the distance from the insertion end 34. Accordingly, the diameter 38 of the engagement portion 36 of the locating pins 28 is smallest near the insertion end 34, and largest near the supported end 32.

Figure 4:
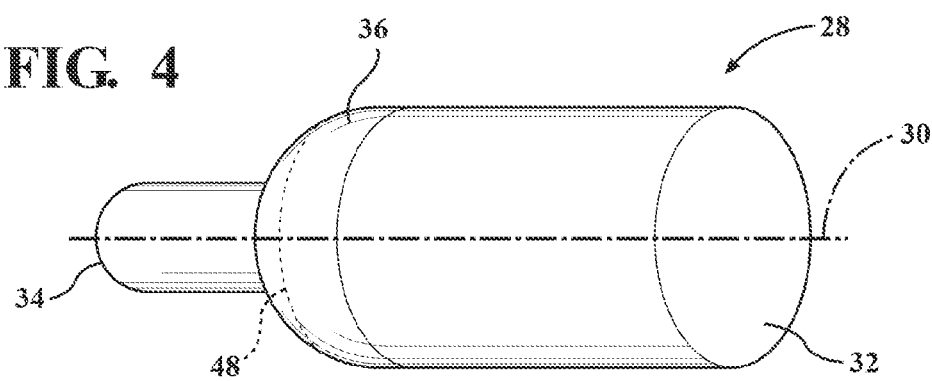
FIG. 4 is a schematic perspective view of a locating pin showing a tapered semi-spherical engagement portion.
Figure 5:
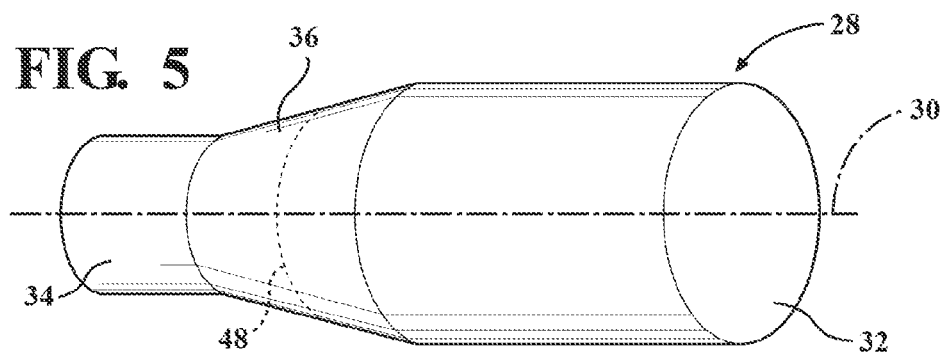
FIG. 5 is a schematic perspective view of a locating pin showing a tapered conical engagement portion.

The engagement portion 36 of the locating pin 28 may include, for example, one of a semi-spherical section, or a conical section to form the taper of the engagement portion 36. If the engagement portion 36 is formed by a semi-spherical section, such as shown in FIG. 4, then the diameter 38 of the engagement portion 36 changes along the longitudinal axis 30 of the locating pin 28 at a non-constant rate per unit distance along the longitudinal axis 30. However, if the engagement portion 36 is formed by the conical section, such as shown in FIG. 5, then the diameter 38 of the engagement portion 36 changes along the longitudinal axis 30 of the locating pin 28 at a constant rate per unit distance long the longitudinal axis 30.

The locating pins 28 are operable to engage an existing part feature 40 of a part, i.e., a work piece 26. The presence of the existing part feature 40 is required for the intended use of the part. Accordingly, the existing part feature 40 is a feature of the work piece 26 that must be present in the work piece 26 for the work piece 26 to perform its intended function or operation. As such, the existing part feature 40 must be formed into the work piece 26 regardless of whether or not the existing part feature 40 is used to engage the locating pins 28 of the end effector 24, and serves a purpose other than for engaging the locating pins 28. For example, the existing part feature 40 may include a fluid bore or aperture, a trunion boss, a center of gravity hole, a manufacturing boss, an electrical pass thru connector hole, or some other feature formed into the work piece 26.

It should be appreciated that each locating pin 28 engages a different existing part feature 40. Accordingly, the first locating pin 28A engages a first existing part feature 40A, the second locating pin 28B engages a second existing part feature 40B, and the third locating pin 28C engages a third existing part feature 40C. The existing part features 40 are referred to generally by the reference numeral 40, and referred to specifically and shown in the Figures by reference numerals 40A, 40B, 40C. The existing part features 40 define a circular aperture 42 that is disposed on a feature plane 44. The circular aperture 42 extends into or through the work piece 26 from the feature plane 44. When the locating pins 28 are moved into engagement with the existing part features 40 of the work piece 26, the engagement portion 36 of each of the locating pins 28 engages a radial inner edge of the circular aperture 42 on the feature plane 44 along an approximately annular contact ring 48, disposed about a circumference of the tapered engagement portion 36. As noted above, each of the locating pins 28 includes an insertion end 34. The insertion ends 34 of the locating pins 28 are operable to extend through the circular aperture 42 of the existing part feature 40 when the locating pins 28 are moved into engagement with the existing part features 40.

The locating pins 28 may be oriented relative to each other in any suitable manner that is capable of grasping the specific work piece 26. As shown in FIGS. 1 through 3, the first locating pin 28A and the second locating pin 28B are disposed opposite the third locating pin 28C to grasp the part therebetween. As such, the first locating pin 28A and the second locating pin 28B are disposed on one side of the work piece 26, while the third locating pin 28C is disposed on an opposing side of the work piece 26. However, it should be appreciated that the locating pins 28 may be oriented relative to each other differently than shown and described herein, and may be dependent upon the location and availability of the existing part features 40.

As shown in FIGS. 1 through 3 and described in the exemplary embodiment herein, one of the first locating pin 28A and the second locating pin 28B is fixed in position against movement in a first direction 50 of movement and a second direction 52 of movement relative to the end effector 24, and the other of the first locating pin 28A and the second locating pin 28B may be moveable relative to the end effector 24 in at least the first direction 50 of movement, and possibly the second direction 52 of movement, to align their respective engagement portions 36 with their respective existing part features 40A, 40B. The third locating pin 28C may be moveable in the first direction 50 of movement and the second direction 52 of movement relative to the end effector 24 to align its respective engagement portion 36 with its respective existing part feature 40C.

As used herein, the first direction 50 of movement may be referred to as a Y axis direction of movement as viewed on the page of FIGS. 1 through 3, and the second direction 52 of movement may be referred to as a Z axis direction of movement as viewed on the page of FIGS. 1 through 3. The first direction 50 of movement is perpendicular to the second direction 52 of movement. Accordingly, if one of the locating pins 28 is moveable in the first direction 50 of movement, then that locating pin 28 may move up or down on the page as shown in FIGS. 1 through 3. If one of the locating pins 28 is moveable in the second direction 52 of movement, then that locating pin 28 may move into and out of the page as shown in FIGS. 1 through 3. All of the locating pins 28 may be moveable in a third direction 54 of movement. The third direction 54 of movement may be referred to as an X axis direction of movement as viewed on the page of FIGS. 1 through 3. Accordingly, if one of the locating pins 28 is moveable in the third direction 54 of movement, then that locating pin 28 may move left or right on the page as shown in FIGS. 1 through 3.

While the written description provided herein provides an exemplary embodiment in which the first locating pin 28A is moveable in only the third direction 54, the second locating pin 28B is moveable in only the first direction 50 and the third direction 54, and the third locating pin 28C is moveable in the first direction 50, the second direction 52, and the third direction 54, it should be appreciated that the movement of the locating pins 28A, 28B, 28C, may be configured differently. For example, both the first locating pin 28A and the second locating pin 28B may be fixed in position against movement in both the first direction 50 of movement and the second direction 52 of movement relative to the end effector 24, with the third locating pin 28C moveable in only the third direction 54 of movement.

Referring to FIG. 1, in order to grasp the work piece 26, the robotic arm 22 positions the end effector 24 relative to the work piece 26. The first locating pin 28A is then moved along the longitudinal axis 30 of the locating pin 28, in the third direction 54 of movement, until the tapered engagement portion 36 of the first locating pin 28A contacts the radial inner edge of the circular aperture 42 of the existing part feature 40A. The second locating pin 28B may then be moved in the first direction 50 of movement, to concentrically align the second locating pin 28B with its respective circular aperture 42 of its respective existing part feature 40B. In order to move the second locating pin 28B in the first direction 50 of movement, the end effector 24 may define a slot (not shown), with the second locating pin 28B moveable within the slot relative to the end effector 24. As such, the second locating pin 28B may include a solid pin such as shown in FIG. 4 or 5, and still be moveable relative to the work piece 26. Alternatively, the second locating pin 28B may be configured such as shown in FIGS. 6 and 7 in order to provide the movement in the first direction 50 of movement.

Referring to FIG. 2, once the second locating pin 28B is aligned with its respective circular aperture 42, the second locating pin 28B may then be moved along the longitudinal axis 30 of the second locating pin 28B, in the third direction 54 of movement, until the tapered engagement portion 36 of the second locating pin 28B contacts the radial inner edge of the circular aperture 42 of the existing part feature 40B. The third locating pin 28C may then be moved in the first direction 50 of movement and/or in the second direction 52 of movement to concentrically align the third locating pin 28C with its respective circular aperture 42 of its respective existing part feature 40C. Referring to FIG. 3, once the third locating pin 28C is aligned with its respective circular aperture 42, the third locating pin 28C may then be moved along the longitudinal axis 30 of the third locating pin 28C, in the third direction 54 of movement, until the tapered engagement portion 36 of the third locating pin 28C contacts the radial inner edge of the circular aperture 42 of the existing part feature 40C.

The end effector 24 may be constructed such that the locating pins 28 move as a whole relative to the end effector 24. For example, the locating pins 28 may be placed on a track or some other system that allows the locating pins 28 to move relative to the end effector 24. Alternatively, referring to FIGS. 6 and 7, the locating pins 28 may be constructed such that the tapered engagement portion 36 of the locating pins 28 include segmental portions that move relative to each other to adjust the position of the tapered engagement portion 36 relative to the radial inner edge of the circular aperture 42, to align the tapered engagement portion 36 with the circular aperture 42. By moving the different tapered segmental portions along the longitudinal axis 30 of the respective locating pin 28 relative to each other, the relative position that the engagement portion 36 contacts the radial inner edge of the circular aperture 42 is moved.

Figure 6:
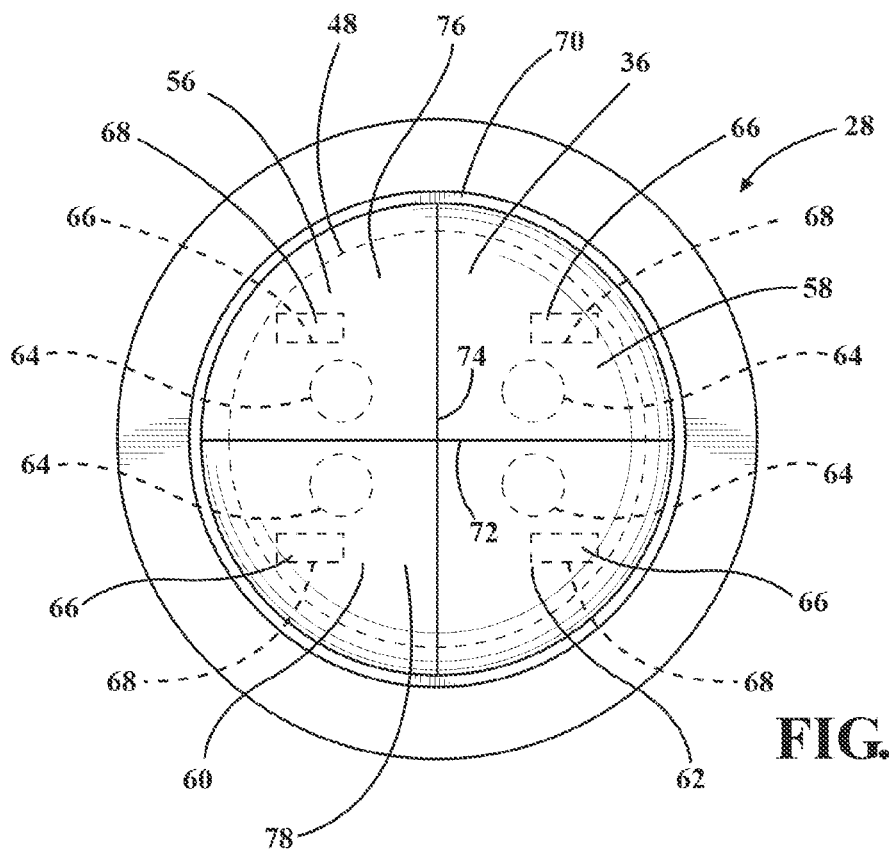
FIG. 6 is a schematic top view of a locating pin, viewed perpendicular to a longitudinal axis of the locating pin.

As shown in FIGS. 6 and 7, for example, the engagement portion 36 includes a first portion 56, a second portion 58, a third portion 60, and a fourth portion 62, each moveable along the longitudinal axis 30 relative to each other. The movement of each of the individual segmental portions 56, 58, 60, 62 may be controlled by an actuator 64 dedicated to the movement of a respective one of the segmental portions 56, 58, 60, 62, and guided by a bar 66 supported by a slot 68 in each of the respective segmental portions 56, 58, 60, 62. The actuator 64 may include a hydraulic actuator, a solenoid actuator, or some other similar device. The different segmental portions 56, 58, 60, 62 may be coupled together by a coupling device 70, such as but not limited to a clip, a band, or some other similar device.

The first portion 56 and the second portion 58 are moveable along a first plane 72 relative to the third portion 60 and the fourth portion 62. The first portion 56 and the third portion 60 are moveable along a second plane 74 relative to the second portion 58 and the fourth portion 62. The first plane 72 and the second plane 74 are each disposed orthogonal to the feature plane 44. The first plane 72 is disposed perpendicular to the first direction 50 of movement, and the second plane 74 is disposed perpendicular to the second direction 52 of movement. In order to adjust the location of the engagement portion 36 of the locating pin 28 in both the first direction 50 of movement and the second direction 52 of movement, each of the first portion 56, the second portion 58, the third portion 60, and the fourth portion 62 are moved relative to each other. It should be appreciated that shifting the different segmental portions 56, 58, 60, 62 relative to each other alters the circumferential shape of the engagement portion 36, such that annular contact ring 48 of engagement between the engagement portion 36 and the radial inner edge of the circular aperture 42 may not be a perfect circle.

If the locating pin 28 need only move in a single direction of movement, then the segmental portions 56, 58, 60, 62 may operate or be constructed in pairs. For example, if the locating pin 28 needs only to move in the first direction 50 of movement, then the first portion 56 and the second portion 58 may operate or be formed as a first half 76, and the third portion 60 and the fourth portion 62 may operate or be formed as a second half 78. In order to adjust the location of the engagement portion 36, the first half 76 and the second half 78 are moved relative to each other along the longitudinal axis 30 of the locating pin 28, thereby altering the position of the annular contact ring 48 where the engagement portion 36 meets the radial inner edge of the circular aperture 42. It should be appreciated that the locating pin 28 may be configured in some other manner to provide the relative positional adjustment necessary to align the engagement portion 36 with the circular aperture 42.

As described above, the locating pins 28 include an insertion end 34 that is operable to pass through the circular aperture 42. Referring to FIG. 8, the locating pins 28 may further include a clamping mechanism 80 disposed near the insertion end 34 of the locating pin 28. The clamping mechanism 80 includes a grasping feature 82 that is operable, when actuated, to engage a backside 84 of the work piece 26 to clamp the work piece 26 between the grasping feature 82 and the engagement portion 36 of the locating pin 28. As shown in FIG. 8, for example, the clamping mechanism 80 may include a wedge 86 that is moveable by a clamping actuator 88 along the longitudinal axis 30 relative to a central housing 90. The grasping feature 82 includes a radially expandable ring that is coupled to the central housing 90, and axially fixed in position along the longitudinal axis 30 by the central housing 90. The wedge 86 causes the grasping feature 82 to expand radially outward as the wedge 86 moves along the longitudinal axis 30 toward the grasping feature 82. Accordingly, the insertion end 34 of the locating pin 28, including the central housing 90, the grasping feature 82 and the wedge 86, may be sized smaller than the circular aperture 42 to pass through the circular aperture 42, without the insertion end 34 contacting an interior surface 92 of the circular aperture 42. Upon movement of the wedge 86 along the longitudinal axis 30, the grasping feature 82 expands radially outward to engage the backside 84 of the work piece 26. It should be appreciated that the clamping mechanism 80 may be configured in some other manner than described herein.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:
1. A part transfer system comprising:
an end effector attachable to a robotic arm;
wherein the end effector includes at least one locating pin operable to engage an existing part feature of a part, wherein the presence of the existing part feature is required for an intended use of the part;

wherein the existing part feature defines a circular aperture disposed on a feature plane; wherein the at least one locating pin includes an engagement portion that extends along a longitudinal axis of the at least one locating pin;

wherein the engagement portion includes a diameter that is tapered along the longitudinal axis such that the engagement portion of the locating pin engages a radial inner edge of the circular aperture on the feature plane along an approximately annular contact ring disposed about a circumference of the tapered portion, and the at least one locating pin includes a first locating pin, a second locating pin, and a third locating pin, with the first locating pin and the second locating pin disposed opposite the third locating in to grasp the part therebetween.

2. A part transfer system as set forth in claim 1 wherein the engagement portion of the locating pin defines one of a semispherical section having a diameter that changes along the longitudinal axis of the locating pin at a non-constant rate, or a conical section having a diameter that changes along the longitudinal axis of the locating pin at a constant rate.

3. A part transfer system as set forth in claim 1 wherein the locating pin includes an insertion end operable to extend through the circular aperture of the existing part feature, with the diameter of the engagement portion increasing in size as the distance from the insertion end of the locating pin increases.

4. A part transfer system as set forth in claim 1 wherein one of the first locating pin and the second locating pin is fixed in position relative to the end effector, and the other of the first locating pin and the second locating pin is moveable in at least a first direction of movement to align the respective engagement portion with the respective circular aperture.

5. A part transfer system as set forth in claim 4 wherein the third locating pin is moveable in the first direction of movement and a second direction of movement to align the respective engagement portion with the respective circular aperture, wherein the first direction of movement is perpendicular to the second direction of movement.

6. A part transfer system as set forth in claim 1 wherein the at least one locating pin is moveable relative to the end effector in a first direction of movement to align the engagement portion with the circular aperture.

7. A part transfer system as set forth in claim 6 wherein the engagement portion includes a first portion and a second portion moveable relative to each other along a first plane, wherein the first plane is disposed orthogonal to the feature plane, and perpendicular to the first direction of movement.

8. A part transfer system as set forth in claim 6 wherein the at least one locating pin is moveable relative to the end effector in a second direction of movement to align the engagement portion with the circular aperture, wherein the second direction of movement is perpendicular to the first direction of movement.

9. A part transfer system as set forth in claim 8 wherein the engagement portion includes a first portion, a second portion, a third portion, and a fourth portion moveable relative to each other, with the first portion and the second portion moveable along a first plane relative to the third portion and the fourth portion, and the first portion and the third portion moveable along a second plane relative to the second portion and the fourth portion, wherein the first plane and the second plane are each disposed orthogonal to the feature plane, the first plane is disposed perpendicular to the first direction of movement, and the second plane is disposed perpendicular to the second direction of movement.

10. A part transfer system as set forth in claim 1 wherein the at least one locating pin includes an insertion end operable to pass through the circular aperture, and a clamping mechanism disposed near the insertion end of the at least one locating pin and having a grasping feature operable to engage a backside of the part to clamp the part between the grasping feature and the engagement portion.

11. A method of grasping a part with a part transfer system, the method comprising:

providing an end effector for a robotic arm that includes at least one locating pin having a tapered engagement portion;

moving the tapered engagement portion of the locating pin into abutting engagement with an inner radial edge of a circular aperture of an existing part feature of the part, wherein the presence of the existing part feature of the part is required for an intended use of the part, and wherein the engagement portion contacts the inner radial edge of the circular aperture on a feature plane along an approximately annular contact ring disposed about a circumference of the tapered engagement portion;

wherein the at least one locating in of the end effector includes a first locating pin, a second locating pin, and a third locating pin, each operable to engage respective existing part features having respective circular apertures, and wherein moving the tapered engagement portion of the locating pin into abutting engagement with the inner radial edge of the circular aperture of the existing part feature is further defined as moving the tapered engagement portion of the first locating in into abutting engagement with the respective inner radial edge of the respective circular aperture.

12. A method as set forth in claim 11 further comprising moving the second locating pin in a first direction of movement to concentrically align the second locating pin with the respective circular aperture of the respective existing part feature.

13. A method as set forth in claim 12 further comprising moving the third locating pin in the first direction of movement and in a second direction of movement to concentrically align the third locating pin with the respective circular aperture of the respective existing part feature.

14. A method as set forth in claim 13 wherein moving the second locating pin in the first direction of movement, and the third locating pin in the first direction of movement and the second direction of movement includes moving the locating pin relative to the end effector and relative to the first locating pin.

15. A method as set forth in claim 13 wherein the tapered engagement portions of each of the second locating pin and the third locating pin include segmental portions that move relative to each other to adjust the position of the tapered engagement portion relative to the inner radial edge of the circular aperture to align the tapered engagement portion with the circular aperture, and wherein moving the second locating pin in the first direction of movement, and the third locating pin in the first direction of movement and the second direction of movement includes moving the segmental portions of the second locating pin relative to each other and moving the segmental portions of the third locating pin relative to each other.

16. A method as set forth in claim 11 wherein the locating pin includes a clamping mechanism disposed adjacent an insertion end of the locating pin, and wherein the method further comprises inserting the insertion end of the locating pin through the circular aperture, and actuating the clamping mechanism to grasp a back side of the part to clamp the part between the clamping mechanism and the engagement portion of the locating pin.

17. A method as set forth in claim 11 wherein moving the tapered engagement portion of the locating pin into abutting engagement with the inner radial edge of the circular aperture of the existing part feature includes moving the tapered engagement portion along a longitudinal axis of the locating pin in a third direction of movement.

18. A method as set forth in claim 11 wherein moving the tapered engagement portion of the locating pin into abutting engagement with the inner radial edge of the circular aperture of the existing part feature includes moving an insertion end of the locating pin through the circular aperture without the locating pin contacting an interior surface of the circular aperture.

* * * * *